United States Patent [19]

Ciekanski

[11] Patent Number: 4,738,290

[45] Date of Patent: Apr. 19, 1988

[54] BEVERAGE VENDING MACHINE

[75] Inventor: Francois Ciekanski, Villers-les-Nancy, France

[73] Assignee: Societe de Fabrication d'Appareils Automatique et Siropsdite, Vigy, France

[21] Appl. No.: 935,573

[22] Filed: Nov. 26, 1986

Related U.S. Application Data

[63] Continuation-in-part of Ser. No. 759,417, Jul. 26, 1985, Pat. No. 4,655,266.

[30] Foreign Application Priority Data

Jul. 27, 1984 [FR] France .................. 84-12112

[51] Int. Cl.⁴ .................. B65B 1/04; B65B 3/04
[52] U.S. Cl. .................. 141/82; 141/104; 141/174
[58] Field of Search .................. 141/83, 129–191, 141/82, 100–110

[56] References Cited

U.S. PATENT DOCUMENTS 2,956,706 10/1960 Austgen et al. .................. 141/174
4,094,345  6/1978 Deziel .................. 141/174
4,625,776 12/1986 Mikkelsen .................. 141/174

*Primary Examiner*—Houston S. Bell, Jr.
*Attorney, Agent, or Firm*—Robert E. Burns; Emmanuel J. Lobato

[57] ABSTRACT

A beverage vending machine for dispensing hot-water or cold-water beverages formulated from selected water-soluble extracts comprises essentially a plurality of containers for storing the various extracts, a main water storage tank, means for producing hot and cold water, means for delivering cups in succession from a storage magazine to a cup dispenser, a pouring spout for mixing and homogenizing the beverage, means for guiding each cup during its transfer from a readiness position to a position of access to the cup in an access recess, metering means associated with one of the containers for picking up a predetermined amount of water-soluble extract and acting as a seal between a delivered cup and the cup dispenser, and a slide valve associated with each storage container and adapted to be reciprocated for transferring the metered amount of water-soluble extract from one of the containers to the cup, a radial array of control means driven by a single power unit through a control mechanism, each control means being actuated separately as a function of the selected beverage so that a selected means controlling the radial array of valves disposed concentrically around the cup dispenser is caused to perform an angular movement converted into a reciprocating movement of the selected slide valve.

13 Claims, 3 Drawing Sheets

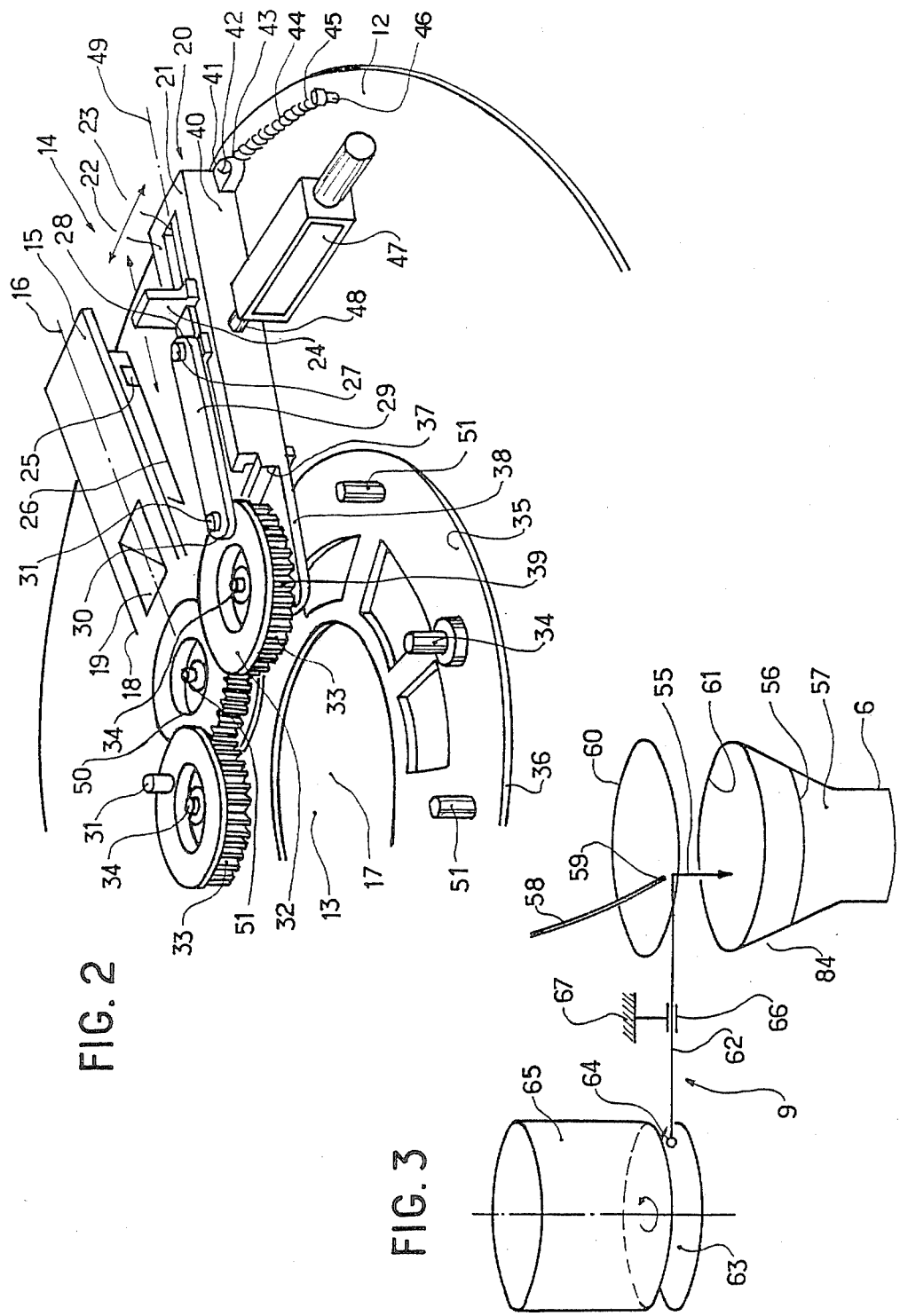

BEVERAGE VENDING MACHINE

CROSS REFERENCE

This application is a Continuation-in-Part of my co-pending application Ser. No. 06/759,417 filed on July 26th, 1985, now in force, as U.S. Pat. No. 4,655,266.

BACKGROUND OF THE INVENTION

1. Field of the Invention

This invention relates to a beverage vending machine.

It relates more particularly to a beverage vending machine comprising an upper part for containing at least one beverage ingredient receptacle in liquid or solid form from which a beverage is to be formulated, a lower part of the vending machine below the upper part defining a delivery recess for providing access to a dispensed cup containing the formulated beverage, a cup magazine interiorly of the vending machine above the level of the delivery recess for storing individual cups for delivery to a readiness position for receiving a metered amount of said beverage ingredient, a metering slide valve having a valve gate for receiving under control of gravity a given amount of said beverage ingredient for containing the amount received as a metered quantity for delivery into an individual cup at said readiness position, means for actuating said valve gate for delivering the metered quantity of beverage ingredient into cups successively disposed at said readiness position, means for delivering each cup containing said metered quantity into position into said delivery recess, and means for delivering a liquid into said cup while at said delivery recess for mixture with the beverage ingredient in the individual cup.

The beverage vending machine includes also means for selectively mixing said mixture within each said cup at said delivery recess and a plurality of receptacles for each containing a beverage ingredient, and in which said valve gate comprises a rotatable plate having a plurality of metering spaces positionable cyclically in registry with said receptacles, said receptacles each having a lower opening continuously open for delivery of the corresponding beverage ingredient into a corresponding metering space placed in registry with said lower opening, and said rotatable plate being rotatable to position individual metering spaces successively over successive cups at said readiness position.

However, it was found that when an electromagnet is used for imparting a reciprocating motion to the metering slide valve containing the water-soluble extract, this electromagnet had to be relatively powerfull. As a result, hunting was observed in operation and this is liable to cause shocks detrimental to the beverage vending machine.

On the other hand, the use of means for mixing the beverage, which comprise a driving member, grippers for picking up a stirring blade from a storage magazine and elements controlling the opening and/or closing movements of the grippers when picking up the stirring blade in the storage magazine or releasing the blade into the cup or tumbler, proved to be a relatively complicated, extremely expensive and cumbersome solution in that it occupied much space in the beverage vending machine.

Moreover, it was found that the movement of the cup containing the water-soluble extract from its loading area to its filling position under the pouring spout and subsequently to the access recess was not satisfactory. In fact, this movement is obtained by allowing the cup to slide by gravity along a guide chute. Now it appeared that in frequent cases the weight of the cup filled with a metered quantity of water-soluble extract was not sufficient for positively warranting this sliding movement.

It is essential object of the present invention to avoid these inconveniences.

SUMMARY OF THE INVENTION

The present invention relates to a beverage vending machine, adapted to dispense hot- or cold-water beverages formulated from a water-soluble extract, said machine comprising essentially containers for storing the water-soluble extract, a main water storage tank, means for producing hot or cold water, means for delivering cups or tumblers successively to the machine, a pouring spout connected to the hot- and cold-water producing means, beverage mixing or homogenizing means, cup guiding means for transferring each cup from a filling position to a readiness position of access to a delivery recess, metering means associated with one of the storage containers and adapted to deliver a predetermined quantity of water-soluble extract and to act as a fluid-tight gate between the cup and the cup delivering means, said metering means comprising for each storage container a slide valve adapted to be reciprocated for transferring the metered quantity of water-soluble extract from one of said storage containers into the cup, a radial array of control means resiliently urged to their inoperative positions and responsive to a single power unit or motor adapted to drive an intermediate mechanism comprising a plurality of control means responsive separately, as a function of the selected beverage, to an angular movement such as to impart said reciprocating motion to the slide valve selected among said slide valves disposed radially around said cup delivery means.

This invention is also directed to provide an improved machine for formulating and dispensing beverages consisting of hot or cold water and of a water-soluble extract, which comprises essentially a plurality of containers for storing the water-soluble extract, a main water storage tank, means for producing hot or cold water, means for delivering cups or tumblers to the machine, metering means associated with one of the storage containers and adapted to deliver a predetermined amount of water-soluble extract and to constitute a fluid tight gate between the cup and cup delivering means, cup guiding means for transferring each cup from a filling or readiness position to a position of access to a cup delivery recess, a pouring spout connected to the hot- and cold-water production means, beverage mixing and homogenizing means comprising a driving member adapted to rotate a turntable acting as a disk-crank, a connecting-rod having one end pivotally connected to the turntable and its other end connected to the pouring spout so as to direct, along a circle concentric to the circular inner wall of the cup, a jet of pressure-fed water perpendicularly to the rising surface of the beverage in the cup.

This invention is furthermore concerned with an improved beverage vending machine for dispensing beverages consisting of hot or cold water and of a water-soluble extract, which comprises essentially containers for storing the water-soluble extract, a main water storage tank, means for producing hot or cold water, means for delivering cups or tumblers to the machine, metering means associated with one of the storage containers for delivering a predetermined amount of water-soluble extract and constituting a fluid-tight gate between the cup and the cup delivering means, a pouring spout connected to the hot- or cold-water production means, means for mixing or homogenizing the beverage, cup guiding means capable of transferring each cup from a filling or readiness position to a position of access to the recess, which comprise gripping means consisting essentially of a power unit or motor having a vertical shaft rotatably coupled to a two-armed member, the arms of this member extending on either side of said vertical shaft and having each a forked end between the prongs of which the cup can be supported for transferring, during the rotational movement of this arm, the cup containing the metered amount of water-soluble extract from its loading area to its water receiving area comprising the mixing and homogenizing means and subsequently to the access recess.

The advantages characterising the structure of the present invention lie essentially in the fact that the cost of the machine is cut considerably by dispensing with bulky and expensive electromagnets and simplifying the mixing means, while increasing the reliability of the beverage dispenser and suppressing noxious jolts and shocks during the operation of the machine.

The invention will now be described more in detail with reference to the accompanying drawings.

BRIEF DESCRIPTION OF THE DRAWINGS

FIG. 2 is a diagrammatical and fragmentary perspective view showing one of the metering means of the beverage vending machine;

FIG. 3 is a diagrammatic perspective view showing the mixing and homogenizing means of the beverage vending machine.

DESCRIPTION OF THE PREFERRED EMBODIMENT

Figure 1:
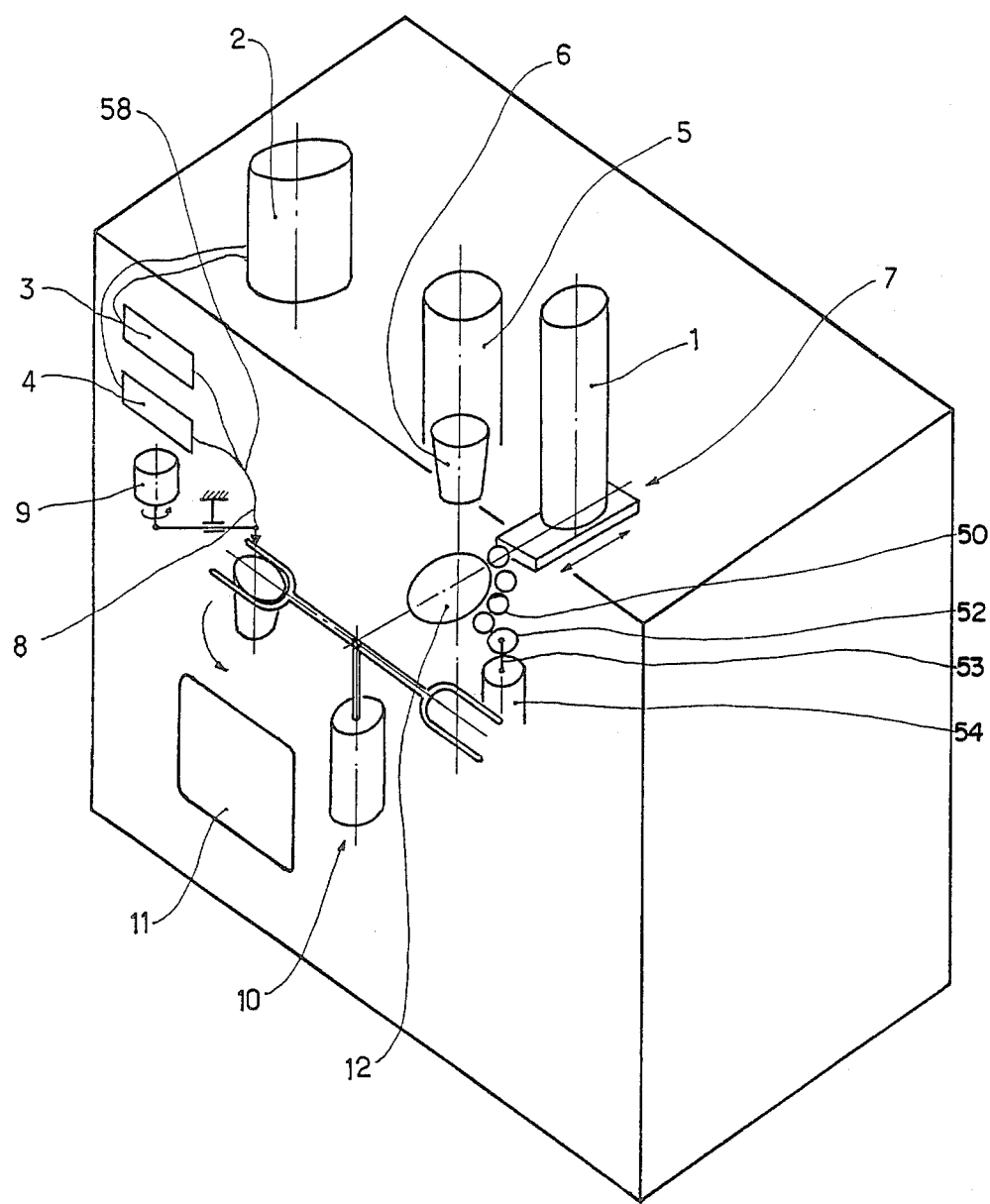
FIG. 1 is a diagrammatic isometric view showing in vertical section the beverage vending machine operated with hot or cold water and a water-soluble extract according to the invention.

According to the invention and referring to FIGS. 1 and 2 of the drawings, the vending machine for hot or cold water beverages prepared from a water-soluble extract comprises a plurality of containers or receptacles 1 filled preliminarily with water-soluble extracts permitting the preparation at will of coffee, tea, chocolate, soup or any other similar beverages, a main water storage tank 2, means 3, 4 for producing hot water or cold water, respectively, means 5 for delivering cups or tumblers 6, metering means 7 disposed underneath the storage containers 1, adapted to deliver a predetermined amount of water-soluble extract and to act as a seal between the cup 6 and the cup delivering means 5. On the other hand, the beverage vending machine comprises a pouring spout 8 connected to the hot- and cold-water production means 3, 4, means 9 mixing and homogeneizing the beverage and means 10 for guiding the cup 6 during its movement from a filling position to an access position to a cup delivery recess 11.

According to the instant invention, the machine comprises a turntable 12 supporting the metering means 7 adapted to pick up from one of the storage containers 1 a predetermined amount of water-soluble extract and to pour the extract into the cup or tumbler 6 received in a central bore 13 of turntable 12. The metering means 7 comprise pick-up means 14 consisting of a radial array of slide valves 15 of which all the center lines 16 converge toward the center 17 of turntable 12. The number of slide valves 15 is subordinate to the number of containers 1 depending in turn on the number of different beverages that the machine can dispense. The slide valves 15 comprise at one end 18 an opening 19 adapted to receive a predetermined amount of water-soluble extract. This amount is a function of the slide valve thickness and also of the cross-sectional area of opening 19. During the operation of the machine, the slide valve 15 is reciprocated by a driving mechanism 20. Since each slide valve 15 is actuated by a separate driving mechanism 20, the various driving mechanisms 20 constitute a radial assembly offset angularly with respect to the radial assembly of slide valves 15.

Each driving mechanism 20 comprises a slideway 21 having formed in its upper face 22 a groove 23 engaged by a push member 24 protruding above the upper surface 22 of slideway 21. In operation this push member 24 engages a recess 25 formed in the bottom surface 26 of slide valve 15.

The push member 24 is connected via a pivot pin 27 to one end of a link 29 having its opposite end 30 connected via another pivot pin 31 to the flange 32 of a driven pinion 33. This pinion 33 rotates about a vertical stub shaft 34 projecting above the top surface 35 of an annular member 36 concentric and rigidly fastened to the turntable 12.

The slideway 21 comprises at its inner end 37 a plate extension 38 in which an opening 39 is formed through which the vertical shaft 34 protrudes so that the slideway 21 can pivot about this vertical shaft 34. Furthermore, the slideway 21 comprises on one of its longitudinal side faces 40 a lug 41 provided with a hole 42 for attaching one end of a resilient member 44, for example a tension spring, having its other end anchored to a stud 46 fitted in turntable 12.

According to the present invention, an angular motion is imparted to the driving mechanisms 20. This motion is obtained by means of a fluid-operated cylinder 47 secured to the turntable 12 and bearing with its piston or piston rod 48 against the longitudinal side face 40 of slideway 21.

When the machine is inoperative, the pivot pin 27 and vertical shaft 34 are aligned and merge with the longitudinal center plane 49 of slideway 21.

The driven pinion 33 is in constant meshing engagement with an idler pinion 50 rotating about a stub shaft 51 secured to the turntable 12. One idler pinion 50 is in constant meshing engagement with a drive pinion 52 keyed to the drive shaft 53 of a single motor unit 54 (FIG. 1).

The metering means 7 operate as follows:

When inoperative, the set of slideways 21 is off-set angularly with respect to the set of slide valves 15. When the user of the machine has selected the desired beverage, the machine is started and one of the fluid-operated cylinders 47 is ectuated so that its piston 48 will exert a pressure against the corresponding slideway 21. Thus, this slideway will pivot about the vertical shaft 34 and the push member 24 will engage the recess 25 of slideway 15. Simultaneously, the resilient member 44 is relieved. Then, the single motor unit 54 is started and drives the links 29 through the train of driven pinions 33 and idler pinions 50. However, only the slide valve 15 engaged by push member 24 is reciprocated as a consequence of the actuation of the relevant link 29.

When the water-soluble extract has been deposited into the cup 6 and the slide valve 15 has resumed its initial position, the piston 48 of cylinder 47 is retracted and the resilient member 4 pulls the slideway 21 to rotate same and release the push member 24 during the discharge of slide valve 15.

According to the present invention and as shown in FIG. 3 of the drawings, the beverage vending machine comprises means 9 for mixing or homogenizing the mixture. These means 9 comprise, through the pouring spout 8, at least one jet 55 of water under pressure which is directed at right angles to the surface 56 of beverage 57 as the beverage is built up in cup 6. The pressure water is delivered via a conduit 58 driven by means causing the outlet end 59 of this conduit 58 to describe a circle concentric to the inner wall 61 of cup 6. For this purpose, the conduit 58 is connected via a connecting-rod 62 to a disk-crank 63, by means of a pivot pin 64. This disk-crank 63 is rotatably driven by a motor 65. The connecting-rod 62 is slidably fitted in a bearing 66 mounted on the fixed frame structure 67 of the machine. Thus, a whirling motion is imparted to the liquid beverage in order to properly mix and homogenize its ingredients.

Figure 4:
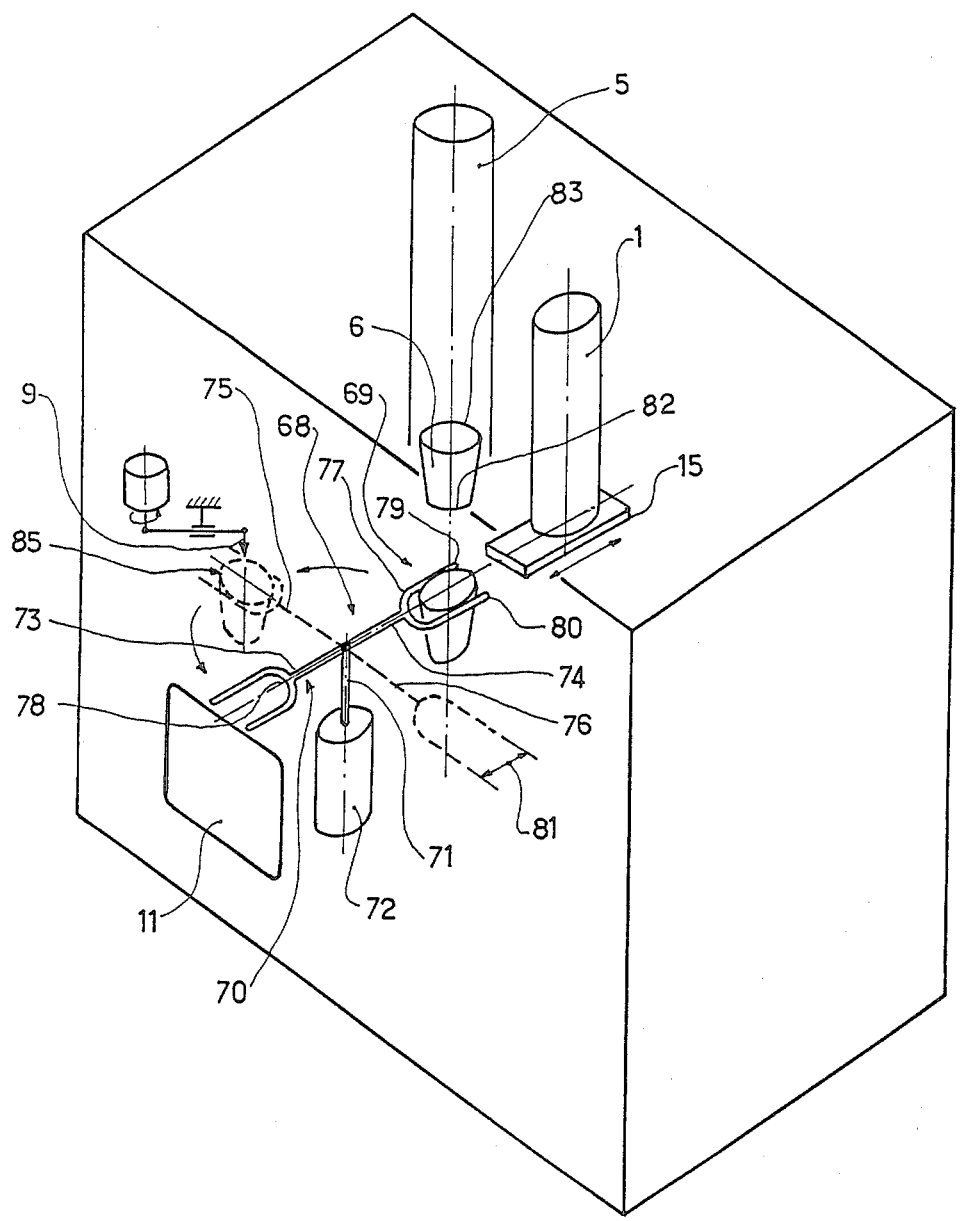
FIG. 4 is a view similar to FIG. 1 showing the gripping means for transferring the cups from its filling area to the access recess.

Reference will now be made to FIG. 4 showing the means 10 for guiding the grippers 68 while transferring the cup or tumbler 6 delivered by the cup dispenser 5 from the readiness area 69, where a water-soluble extract is picked up by one of the slide valves 15 of the corresponding receptacle 1 constituting the storage means containing the various water-soluble extracts, to the access recess 1 from which the user can receive the desired beverage.

These gripping means consist of a horizontal arm 70 rotatably coupled, intermediate its ends, to the vertical output shaft 71 of a power unit or motor 72. The two sections 73, 74 of arm 70 have the same length. Each outer end 75, 76 of each arm 73, 74 of arm 70 has a fork-shaped portion 77, 78. The cup 6 from the cup delivery means 5 has a frustoconical configuration such that when dropped from the cup storage means 5 each cup is supported by, and positioned between, the prongs 79, 80 of one fork 77 or 78. The distance 81 between the prongs 79, 80 of each pair is greater that the minor or base diameter 82 of the frustoconical cup 6 but smaller than the diameter of the major or top diameter of the frustoconical cup 6.

According to a modified form of embodiment illustrated in FIG. 3, the cup 6 has an outflared neck portion 84. Thus, the distance 81 is greater than the diameter of the cylindrical portion of cup 6 but smaller than the major diameter of said outflared neck portion 84.

After pouring the metered amount of extract into the cup, the fork 77 supporting the filled cup is rotated through an angular distance sufficient to bring the cup 6 to the filling area 85 comprising the mixing means 9.

Upon completion of the mixing step, the fork 77 describes again an angular movement to bring the cup 6 to a position of registry with the access recess 11.

Simultaneously, the fork 78 is brought to a position underneath the means delivering the cups 5 and a new cup 6 is thus placed in a readiness position for receiving another metered amount of water-soluble extract.

What is claimed is:

1. A beverage vending machine for dispensing hot-water or cold-water beverages formulated from a selected water-soluble extract, which comprises a plurality of containers for storing the various water-soluble extracts, a main water storage tank, means for producing hot water and cold water from water from said main water storage tank, a pouring spout connected with said hot-water and cold-water producing means, means for delivering cups in succession to be filled, means for transporting said cups successively to a position to receive water-soluble extract from an extract storing container, a position to receive hot or cold water and to a position of access in an access recess, metering means associated with each of said extract storing containers for picking up a predetermined amount of water-soluble extract and to act as a seal between a delivered cup and said extract storing container, said metering means comprising a radial array of slide valves, one associated with each extract storing container and adapted to be reciprocated for transferring a metered amount of water-soluble extract from one of said extract storing containers to said cup, a radial array of control means driven by a single power unit through control mechanism, each control means being activated separately as a function of the selected beverage so that the selected slide valve of said radial array of slide valves is caused to perform a reciprocating movement, and means for mixing and homogenizing the beverage.

2. The beverage vending machine of claim 1, wherein said control mechanism comprise a turntable and, for each slide valve, a slideway pivoted at one end and provided in its upper surface with a groove slidably engaged by a push member adapted to cooperate with a recess formed in the lower surface of said slide valve.

3. The beverage vending machine of claim 2, wherein said control mechanism comprise a link pivotally connected at one end through a pivot pin to said push member and at the other end through another pivot pin to one member of said control mechanism.

4. The beverage vending machine of claim 2, wherein said control mechanism comprises for each slide valve a fluid-actuated cylinder secured to said turntable, the piston of said cylinder bearing against a longitudinal or lateral side face of said slideway so as to impart an angular movement to said slideway for interconnecting said push member and said slide valve.

5. The beverage vending machine of claim 3, wherein said control mechanism comprises for each slide valve a driven pinion connected by a pivot pin to said link and an intermediate pinion transmitting the rotational motion to another driven pinion, and so forth, said driven pinions and intermediate pinions being rotatably mounted on vertical stub shafts rigidly secured to said turntable.

6. The beverage vending machine of claim 1, wherein said control mechanism comprise an intermediate pinion driven by a driving pinion keyed to the output shaft of a single power unit or motor.

7. The beverage vending machine of claim 5, wherein the pivot pin interconnecting said link and said push member, the pivot pin interconnecting said link to said driven pinion and a vertical axis about which said slideway is adapted to pivot are aligned in the inoperative condition of said slide valve, this alignment being merged into the longitudinal center plane of said slideway.

8. The beverage vending machine of claim 4, wherein said means for urging said slideway to an inoperative position comprising a resilient element connected on the one hand to a stud secured to the turntable and on the other hand to a lug secured to said slideway, said resilient element being adapted to retract the piston of said fluid-operated cylinder.

9. A beverage vending machine for dispensing hot-water or cold-water beverages formulated from a selected water-soluble extract, which comprises essentially containers for storing the water-soluble extracts, a main water storage tank, means for producing hot and cold water, means for delivering cups in succession to a cup dispenser, metering means associated with one of said storage containers for picking up a predetermined amount of water-soluble extract and acting as a seal between a delivered cup and said cup dispenser, cup guide means adapted to guide each cup separately during its transfer from a readiness position to a position of access to said cup in a cup delivery recess, a pouring spout connected to said hot-water or cold-water prodution means, beverage mixing and homogenizing means comprising a driving member adapted to rotate a disk-crank, a connecting-rod connected at one end by means of a pivot pin to said disk-crank and at the other end to said pouring spout so as to deliver, along a circle concentric with the circular inner wall of said cup, a jet of water under pressure in a direction substantially perpendicular to and towards the beverage surface being built up in the cup.

10. A beverage vending machine for dispensing hot-water or cold-water beverages formulated from a selected water-soluble extract, which comprises essentially a plurality of containers for storing the water-soluble extract, a main water storage tank, means for producing hot or cold water, means for delivering cups in succession to a cup dispenser, metering means associated with a selected one of said storage containers for picking up a predetermined amount of water-soluble extract and acting at the same time as a seal between a delivered cup and said cup dispenser, a pouring spout connected to said hot- and cold-water production means, means for mixing and homogenizing the beverage, means for guiding each cup during its transfer from a readiness position to a position of access to said cup in a cup delivery recess, said guide means comprising gripping members including a drive member of which a vertical shaft is rotatably coupled to a two-section arm extending on either side of said vertical shaft, each section of said arm being provided at its outer end with a fork adapted to receive a cup between its pair of prongs so that when said vertical shaft is rotated said arm will transfer the cup containing the metered amount of water-soluble extract firstly from its loading area to its readiness position in which the cup is filled with water and the mixture is mixed and homogenized, and subsequently to said access recess.

11. The beverage vending machine of claim 10, wherein the distance between the prongs of each fork is greater than the diameter of the minor base of a frustoconical cup and smaller than the diameter of the major base of said frustoconical cup.

12. The beverage vending machine of claim 10, wherein the distance between the prong of each fork is greater than the diameter of the cylindrical portion of a cup having an outflared neck and smaller than the major diameter of said outflared neck.

13. The beverage vending machine of claim 1, wherein each of said slide valves comprises a slide having a delivery through opening defining a predetermined volume as a function of the thickness of the slide and the cross-sectional size of said opening.

* * * * *